United States Patent
Watanabe et al.

(10) Patent No.: US 7,020,825 B2
(45) Date of Patent: Mar. 28, 2006

(54) DATA PROCESSOR WITH SERIAL TRANSFER OF CONTROL PROGRAM

(75) Inventors: Tomofumi Watanabe, Gifu-ken (JP); Takayuki Suzuki, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 326 days.

(21) Appl. No.: 10/422,150

(22) Filed: Apr. 24, 2003

(65) Prior Publication Data

US 2003/0204807 A1 Oct. 30, 2003

(30) Foreign Application Priority Data

Apr. 25, 2002 (JP) .............................. 2002-123845
Dec. 17, 2002 (JP) .............................. 2002-365473

(51) Int. Cl.
*G06F 13/10* (2006.01)
*G11B 20/18* (2006.01)

(52) U.S. Cl. ...................................... 714/763; 714/769

(58) Field of Classification Search ................ 714/763, 714/769
See application file for complete search history.

(56) References Cited

U.S. PATENT DOCUMENTS

| | | | | |
|---|---|---|---|---|
| 4,965,801 A | * | 10/1990 | DuLac | 714/769 |
| 5,157,670 A | * | 10/1992 | Kowal | 714/769 |
| 5,625,840 A | * | 4/1997 | Numata et al. | 710/5 |
| 5,774,742 A | * | 6/1998 | Nakamura et al. | 710/8 |
| 5,864,568 A | * | 1/1999 | Nemazie | 714/769 |
| 6,115,763 A | * | 9/2000 | Douskey et al. | 710/72 |
| 6,125,469 A | * | 9/2000 | Zook et al. | 714/769 |
| 6,134,631 A | * | 10/2000 | Jennings, III | 711/117 |
| 6,253,349 B1 | * | 6/2001 | Maeda et al. | 714/799 |
| 6,311,014 B1 | * | 10/2001 | Nguyen et al. | 386/125 |
| 6,338,139 B1 | * | 1/2002 | Ando et al. | 713/168 |
| 6,393,561 B1 | * | 5/2002 | Hagiwara et al. | 713/100 |
| 6,466,736 B1 | * | 10/2002 | Chen et al. | 386/126 |
| 6,469,742 B1 | * | 10/2002 | Trovato et al. | 348/553 |
| 6,516,398 B1 | * | 2/2003 | Hwang | 711/202 |
| 6,804,182 B1 | * | 10/2004 | Saito | 369/47.17 |
| 6,842,858 B1 | * | 1/2005 | Suzuki | 713/2 |
| 6,918,027 B1 | * | 7/2005 | Mantey et al. | 712/37 |
| 2002/0092008 A1 | * | 7/2002 | Kehne et al. | 717/168 |
| 2004/0193743 A1 | * | 9/2004 | Byers et al. | 710/4 |
| 2005/0154823 A1 | * | 7/2005 | Bruner et al. | 711/112 |

* cited by examiner

*Primary Examiner*—Stephen M. Baker
(74) *Attorney, Agent, or Firm*—Fish & Richadrson P.C.

(57) ABSTRACT

A data processor that reduces the chip area of a semiconductor substrate. The data processor includes a detection circuit for generating an error detection code with digital data. A correction circuit generates an error correction code with the digital data that includes the error detection code. A control circuit controls the detection processing circuit and the correction processing circuit in accordance with a control program. The data processor further includes a first external memory and a serial/parallel conversion circuit. The first external memory stores a control program. The serial/parallel conversion circuit receives data of the control program in a serial state from the first external memory and provides a second external memory with the control program data in a parallel state when the data processor is activated.

14 Claims, 4 Drawing Sheets

|   | 0 | 1 | 2 | . | . | . | 41 | 42 | |
|---|---|---|---|---|---|---|---|---|---|
| 0 | 0000 | 0001 | 0002 | ·············· | | | 0041 | 0042 | ↑ |
| 1 | 0043 | 0044 | 0045 | ·············· | | | 0084 | 0085 | |
| 2 | 0086 | 0087 | 0088 | ········ | | | 0127 | 0128 | |
| 3 | 0129 | 0130 | 0131 | ···· | | | | 0171 | Header |
| 4 | 0172 | 0173 | ···· | Q Sequence | | | | 0214 | User Data |
| . | | | | | | | | . | EDC |
| . | P Sequence | | | | | | | . | Space |
| . | ↓ | | | | | | | . | |
| 22 | 0946 | 0947 | 0948 | ·············· | | | 0987 | 0988 | |
| 23 | 0989 | 0990 | 0991 | ············ | | | 1030 | 1031 | ↓ |
| 24 | 1032 | 1033 | 1034 | ········ | | 1072 | 1073 | 1074 | P Code |
| 25 | 1075 | 1076 | 1077 | ········ | | 1115 | 1116 | 1117 | Language |
| 26 | 1118 | 1119 | 1120 | ···· | 1143 | | | | Q Code |
| 27 | 1144 | 1145 | 1146 | ···· | 1169 | | | | Language |
|   | 0 | 1 | 2 | . | 25 | | | | |

CD-ROM Encoder/Decoder

DATA PROCESSOR WITH SERIAL TRANSFER OF CONTROL PROGRAM

CROSS-REFERENCE TO RELATED APPLICATIONS

This application is based upon and claims the benefit of priority from the prior Japanese Patent Applications No. 2002-123845, filed on Apr. 25, 2002 and No. 2002-365473, filed on Dec. 17, 2002, the entire contents of which are incorporated herein by reference.

BACKGROUND OF THE INVENTION

The present invention relates to a data processor, and more particularly, to a data processor that adds an error detection code and an error correction code to data provided from a host computer or performs an error correction process and an error detection process on data read from an optical disc medium to decode the data.

An optical disc device records data on an optical disc, which serves as a recording medium. For example, a CD-R/CD-RW system (optical disc device) that uses a CD-recordable (CD-R) disc, in which data is writable only once, or a CD-Rewritable (CD-RW) disc, in which data is rewritable, is widely used. To record data, the CD-R/CD-RW system encodes the data that is to be recorded by adding an error detection code (EDC) and an error correction code (ECC).

FIG. 1 is a block diagram schematically illustrating the configuration of a prior art CD-R/CD-RW system 50. The CD-R/CD-RW system 50 includes a CD-ROM encoder 1, a digital signal processing circuit 2, an analog signal processing circuit 3, a pickup 4, a pickup controller 6, a buffer RAM 7, and a control microcomputer 8.

The CD-ROM encoder 1 fetches 2048 bytes of data transferred from a host computer and encodes the data by adding an error detection code (EDC) and an error correction code (ECC) to the data. The encoding generates a block of CD-ROM data.

A block of CD-ROM data includes 2352 bytes (24 bytes× 98 frames) of data. For example, when in mode 1, as shown in FIG. 2, each block includes 12 bytes of synchronization data, 4 bytes of header data, 2048 bytes of user data, 4 bytes of an error detection code EDC, 8 empty bytes, and 276 bytes of an error correction code ECC. Excluding the synchronization data, a scrambling process is performed on 2340 bytes of the block.

Nowadays, the CD-ROM encoder 1 is also used as a CD-ROM decoder, which decodes the CD-ROM data read from an optical disc by performing an error correction process and an error detection process on the CD-ROM data. In other words, the functions of an encoder and decoder are integrated into an integrated circuit.

A digital signal processing circuit 2 retrieves the CD-ROM data provided from the CD-ROM decoder in units of single frames (24 bytes). Then, the digital signal processing circuit 2 performs a predetermined operation on the data of a single frame in accordance with a cross-interleaved Reed-Solomon code (CIRC) to generate C1 and C2 codes. The digital signal processing circuit 2 adds the generated C1 and C2 codes to the data retrieved from the CD-ROM encoder 1 to generate 32 bytes of data. Further, the digital signal processing circuit 2 performs an interleaving process and then eight to fourteen modulation on the 32 bytes of data.

The analog signal processing circuit 3 receives the EFM modulated data in a serial state from the digital signal processing circuit 2, reads fluctuations in the level of the received data, and generates a laser control signal to control the radiation of a laser beam to the optical disc 5.

The pickup 4 radiates a laser beam on the optical disc 5 in accordance with the laser control signal and records the desired CD-ROM data on the optical disc 5. The optical disc 5 is, for example, a CD-R disc having a recording film in which data is writeable only once or a CD-RW disc having a recording film in which data is rewritable. In the CD-R disc, the recording film, which is formed from organic pigments, is melted by the heat of a high power laser beam. This forms pits for recording data. In the CD-RW disc, the recording film is suddenly heated and suddenly cooled to form an amorphous phase so that the reflectance of light changes to record data.

The pickup controller 6 controls the position of the pickup so that data is properly recorded along a guide groove preformed on the optical disc S. More specifically, the pickup 4 radiates a laser beam to the guide groove. Then, the amount of deviation of the optical axis of the laser beam from the center of the groove is detected from the reflection of the laser beam. The position of the pickup 4 is corrected in accordance with the deviation amount so that the laser beam properly traces the guide groove.

The buffer RAM 7 is connected to the CD-ROM encoder 1 to temporarily store the data provided to the CD-ROM encoder 1 from the host computer. In the CD-ROM encoder 1, an error detection code EDC and an error correction code ECC are calculated for each block. Since the calculated codes are added to a single block of data, at least one block of CD-ROM data is required to perform processing with the CD-ROM encoder 1. Thus, the buffer RAM 7 is provided to store a single block of CD-ROM data required for processing.

The control microcomputer 8 controls the CD-ROM encoder 1, the digital signal processing circuit 2, the analog signal processing circuit 3, and the pickup controller 6 in accordance with a control program. The control program is prestored in a non-volatile memory (not shown), such as an externally connected flash memory, and read when required in response to command data provide from the host computer.

In the CD-R/CD-RW system 50, as a result in the progress of integration technology, the control microcomputer 8 and the CD-ROM encoder 1 are formed on the same (single) semiconductor substrate, and a CD-ROM encoder IC incorporating a control microcomputer is manufactured. This reduces the number of parts in the CD-R/CD-RW system 50 and reduces the size of the entire system. However, the nonvolatile memory, which was arranged adjacent to the control microcomputer 8, is externally connected to the CD-ROM encoder IC due to the incorporation of the control microcomputer 8. This increases the total number of pins of the CD-ROM encoder IC. As a result, the chip area of the CD-ROM encoder IC increases. This is an obstacle when further reducing the size of the entire system.

Regardless of the integrated level of the internal circuits, the chip area of a semiconductor integrated device may be determined by the number of pins arranged along the periphery of an IC chip. The recent progress in integration technology has mage this tendency stronger. The tendency may also be seen in the CD-ROM encoder IC (data processor) that incorporates the control microcomputer. For example, in a CD-ROM encoder IC chip having 256 pins, if the IC chip is square, 64 pins are formed on each side of the chip. Since a certain length is required for each side of the IC chip, there is a limit to reducing the side length of the chip even if the integration level of internal circuits is increased and the chip area is reduced. Thus, to further reduce the chip area, the total number of pins arranged on the chip must be decreased.

SUMMARY OF THE INVENTION

One aspect of the present invention is a data processor for adding an error detection code and an error correction code to digital data and encoding the digital data. The data processor includes a detection processing circuit for generating the error detection code in units of blocks with the digital data. A correction processing circuit generates the error correction code for each block with the digital data that includes the error detection code. A control circuit is connected to the detection processing circuit and the correction processing circuit to control the detection processing circuit and the correction processing circuit in accordance with a control program. A first external memory is connected to the control circuit to store the control program. A second external memory is connected to the detection processing circuit and the correction processing circuit to store the digital data together with the error detection code and the error correction code. A serial/parallel conversion circuit is connected to the first and second external memories to receive data of the control program in a serial state from the first external memory and provide the second external memory with the control program data in a parallel state when the data processor is activated.

A further aspect of the present invention is a data processor for performing an error correction process and an error detection process on digital data to which an error correction code and an error detection code are added in units of blocks. The data processor includes a correction processing circuit for performing the error correction process on the digital data. A detection processing circuit is connectable to the correction processing circuit to perform the error detection process on the digital data that has undergone the error correction process. A control circuit is connected to the correction processing circuit and the detection processing circuit to control the correction processing circuit and the detection processing circuit in accordance with a control program. A first external memory is connected to the control circuit to store the control program. A second external memory is connected to the detection processing circuit and the correction processing circuit to store the digital data together with data that has undergone the error correction process and data that has undergone the error detection process. A serial/parallel conversion circuit is connected to the first and second external memories to receive data of the control program in a serial state from the first external memory and provide the second external memory with the control program data in a parallel state when the data processor is activated.

A further aspect of the present invention is a data processor for adding an error detection code and an error correction code to digital data and encoding the digital data. The data processor is connectable to a first external memory for storing a control program and a second external memory for storing data related to data processing. The data processor includes a detection processing circuit for generating an error detection code in units of blocks with the digital data. A correction processing circuit generates an error correction code for each block with the digital data that includes the error detection code. A control circuit is connected to the detection processing circuit and the correction processing circuit to control the detection processing circuit and the correction processing circuit in accordance with the control program. A serial/parallel conversion circuit receives data of the control program in a serial state from the first external memory and provides the second external memory with the control program data in a parallel state. The serial/parallel conversion circuit receives the control program data from the first external memory when the data processor is activated. A memory control circuit is connected to the detection processing circuit, the correction processing circuit, and the serial/parallel conversion circuit. The memory control circuit partially provides the digital data, the error detection code, and the error correction code to the second external memory.

A further aspect of the present invention is a data processor for performing an error correction process and an error detection process on digital data to which an error correction code and an error detection code are added in units of blocks. The data processor is connected to a first external memory for storing a control program and a second external memory for storing data related to data processing. The data processor includes a correction processing circuit for performing the error correction process on the digital data. A detection processing circuit is connected to the correction processing circuit to perform the error detection process on the digital data that has undergone the error correction process. A control circuit is connected to the correction processing circuit and the detection processing circuit to control the correction processing circuit and the detection processing circuit in accordance with the control program. A serial/parallel conversion circuit receives data of the control program in a serial state from the first external memory and provides the second external memory with the control program data in a parallel state. The serial/parallel conversion circuit receives the control program data from the first external memory when the data processor is activated. A memory control circuit is connected to the detection processing circuit, the correction processing circuit, and the serial/parallel conversion circuit. The memory control circuit partially provides the digital data, data that has undergone the error correction process, and data that has undergone the error detection process to the second external memory.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
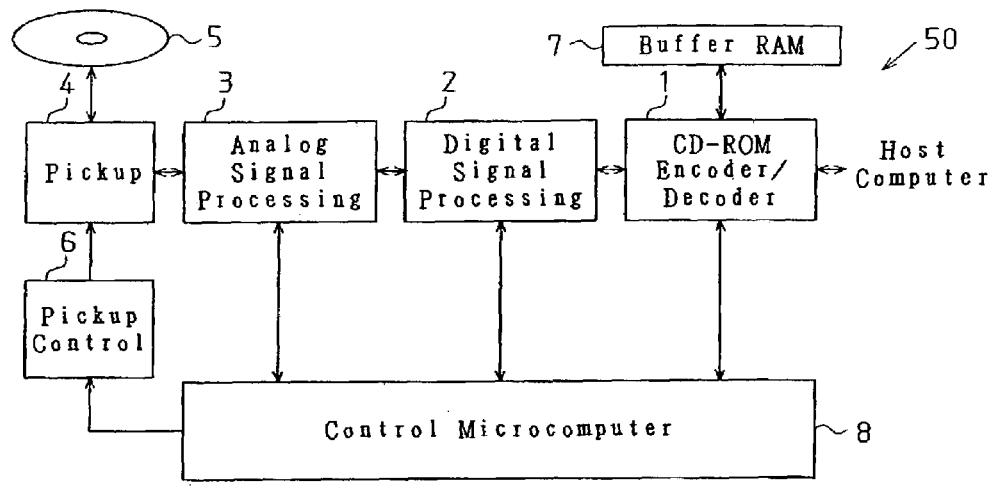
FIG. 1 is a schematic block diagram schematically showing a prior art CD-R/CD-RW system.
Figure 2:
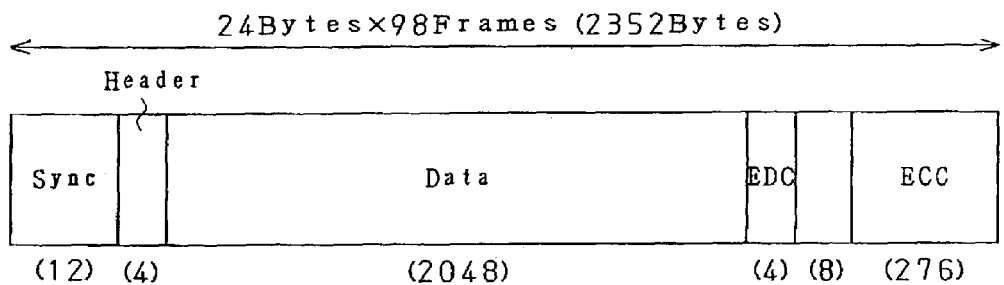
FIG. 2 is a diagram illustrating the format of the CD-ROM data in the prior art.

In the drawings, like reference numerals are used for like elements throughout.

Figure 3:
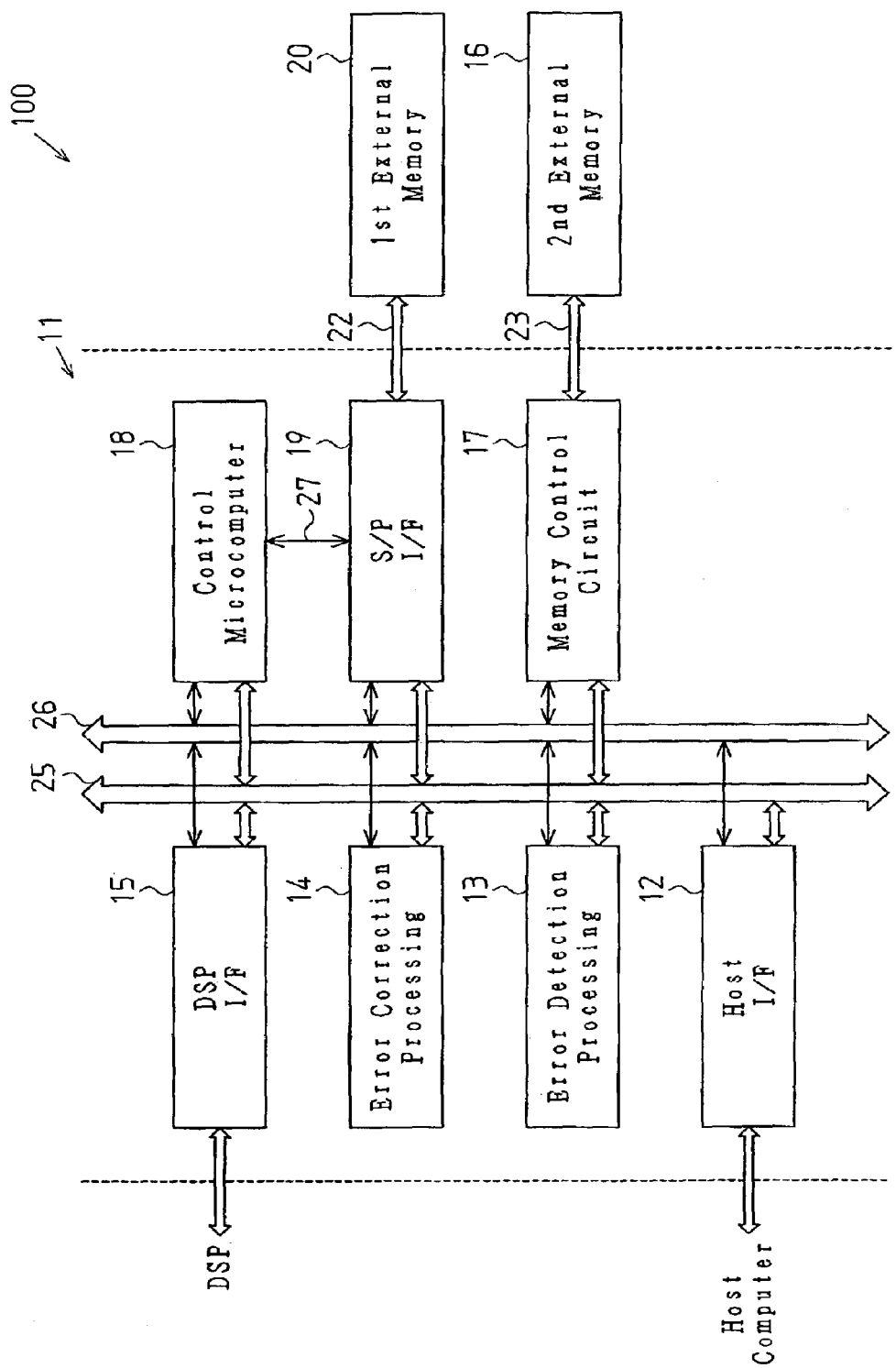
FIG. 3 is a schematic block diagram of a data processor according to a first embodiment of the present invention.

FIG. 3 is a schematic block diagram of a data processor 100 according to a first embodiment of the present invention. The data processor 100 includes a CD-ROM encoder 11, a first external memory 20, and a second external memory 16.

The CD-ROM encoder 11, which is configured on a semiconductor substrate, includes a host interface 12, an error detection processing circuit 13, an error correction processing circuit 14, a DSP interface 15, a control microcomputer 18, a memory control circuit 17, and a serial/parallel conversion circuit 19.

A first external memory 20 and a second external memory 16 are externally connected to the CD-ROM encoder 11. The CD-ROM encoder 11 has the functions of a CD-ROM decoder (hereafter, referred to as CD-ROM encoder/decoder 11).

The host interface 12 is connected to a data bus 25, which serves as a common data transmission route between the host computer side and the CD-ROM encoder/decoder 11, and a command bus 26, which serves as a transmission route for control commands. In response to a control command, the host interface 12 functions as an interface between the CD-ROM encoder/decoder 11 and the host computer.

The error detection processing circuit 13 is connected to the data bus 25 and the command bus 26 to calculate an error detection code EDC parity (EDC(P)) and detect whether there is a code error when reproducing the CD-ROM data. More specifically, when the CD-ROM data is recorded, the error detection processing circuit 13 retrieves the digital data provided from the host computer in units of single blocks. Then, the error detection processing circuit 13 performs a predetermined operation on the retrieved data to calculate the error detection code EDC(P). When the CD-ROM data is reproduced, the error detection processing circuit 13 retrieves a block of CD-ROM data, the code errors of which has been corrected, from the error correction processing circuit 14. Then, the error detection processing circuit 13 performs an operation with the error detection code EDC(P) to detect whether there is a code error.

The error correction processing circuit 14, which is connected to the data bus 25 and the command bus 26, calculates the error correction code ECC(P) (parity of P code language and Q code language) when the CD-ROM data is recorded and corrects the code errors of the CD-ROM data when the CD-ROM data is reproduced. More specifically, when recording the CD-ROM data, the error correction processing circuit 14 retrieves data to which the error detection code EDC(P) is added in units of single blocks and performs a predetermined operation on the data to calculate an error detection code ECC(P) of two systems, which is a P system and a Q system.

Figures 4, 5:
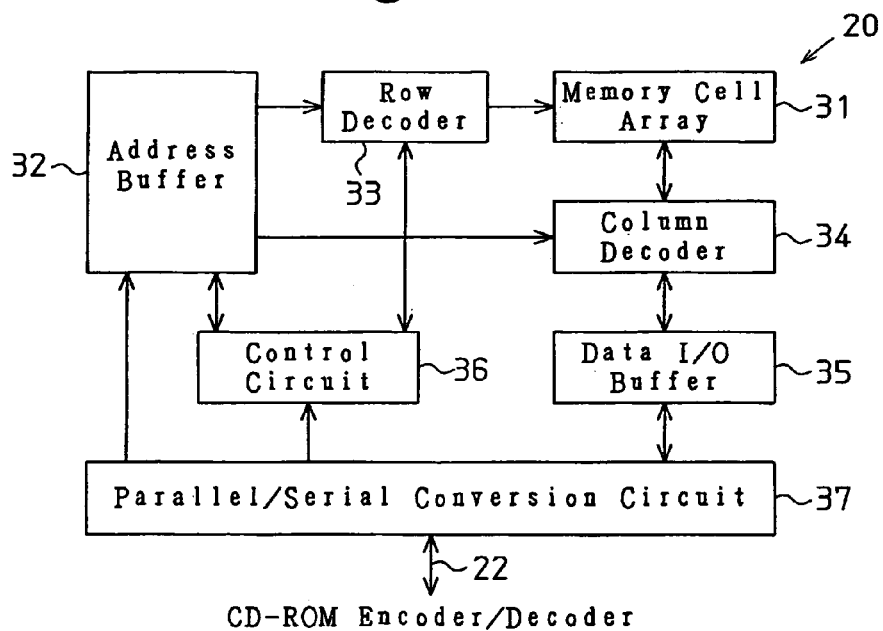
FIG. 4 is a schematic diagram illustrating an error correction code of the CD-ROM data.
FIG. 5 is a schematic block diagram of a first external memory of the data processing device of FIG. 3.

Referring to FIG. 4, in the ECC, two P code words and two Q code words are added to a plane having 1032 bytes of symbol data in accordance with the P system and the Q system for every 24 bytes and every 43 bytes, respectively. The plane is formed by dividing 2064 bytes of CD-ROM data, which includes 12 bytes of synchronization data, 4 bytes of header data, and 2048 bytes of user data, into upper rank byte and lower rank bytes.

When reproducing the CD-ROM data, the error correction processing circuit 14 retrieves the CD-ROM data read from an optical disc in units of single blocks, and uses the error correction code ECC(P) to correct the code error included in the block. During the error correction process of the CD-ROM data, based on the P code and Q code words of each plane, a syndrome operation is performed on the symbol data including each code word. The error caused by the position of a code error in the plane is calculated. The calculated error is added to symbol data, which corresponds to the error position, to correct the code error.

The DSP interface, which is connected to a digital signal processor, functions as an interface between the CD-ROM encoder/decoder 11 and the DSP. The memory control circuit 17 is connected to the second external memory 16, the data bus 25, and the command bus 26 to control the writing of data to and reading of data from the second external memory 16 in response to a control command.

The second external memory 16 is a readable and writeable memory medium, such as a dynamic random access memory (DRAM), a synchronous DRAM (SDRAM), and an SRAM (static random access memory). The second external memory 16 temporarily stores the 2048 bytes of data retrieved from the host computer via the host interface 12 and the data used to perform the error correction and detection of the error detection code EDC(P) calculated by the error detection processing circuit 13.

The second external memory 16 is connected to the memory control circuit 17 by wires 23 and to the data bus 25 and the command bus 26 via the memory control circuit 17. The wire 23 is set in accordance with the number of bits in the data, such as calculation results and address data transferred between the circuits of the second external memory 16 and the CD-ROM encoder/decoder 11. For example, the quantity of the wires 23 is, for example, about forty in which fourteen are for transferring address data, sixteen are for transferring data, and about ten are for control signals used to control each circuit.

The control microcomputer 18 is connected to the data bus 25 and the command bus 26. Via the buses 25 and 26, the control microcomputer 18 is further connected to the error detection processing circuit 13, the error correction processing circuit 14, the DSP interface 15, and the memory control circuit 17. The control microcomputer 18 controls the circuits 12, 13, 14, 15, and 17 via the command bus in a centralized manner. The control microcomputer 18 executes control program data, which is selectively retrieved in accordance with the command data from the host computer.

Further, the control microcomputer 18 is further connected to CD-R/CD-RW system, such as a DSP or a pickup control circuit, to control the entire system in a centralized manner.

The first external memory 20 is, for example, a non-versatile memory, such as a flash memory, and prestores control program data, which the control microcomputer 18 uses. Data is electrically written to and deleted from the first external memory 20 without any restrictions. Thus, the first external memory 20 sequentially-rewrites the control program data in accordance with a command from the host computer.

FIG. 5 is a schematic block diagram of the first external memory 20. The first external memory 20 includes a memory cell array 31, an address buffer 32, a row decoder 33, a column decoder 34, a data input/output buffer 35, a control circuit 36, and a parallel/serial conversion circuit 37.

The memory cell array 31 is an array of memory cells. The address buffer 32 latches address data. The row decoder 33 and the column decoder 34 activate specific memory cells in accordance with the address data. The data input/output buffer 35 latches write data and read data. The control circuit 36 controls the internal circuits of the first external memory 20.

The parallel/serial conversion circuit 37 converts the parallel data read from the memory cell array 31 to serial data and the serial data provided from the CD-ROM encoder/decoder 11 to parallel data. The total number of wires 22 connecting the first external memory 20 to the serial/parallel conversion circuit 19 is three in which one is for data input and output and two are for control signals (address data latching clock signal line and chip enable signal line).

Data lines serve as a transmission route for data read from the memory cell array 31, address data, and command data. Thus, via the data lines, read data or write data is input to or output from the first external memory 20 continuously from the address data. Further, command data is provided to the first external memory 20 in a time-sharing manner with the input and output of read data or write data.

The serial/parallel conversion circuit 19 of FIG. 3 is connected to the first external memory 20 via the wires 22 and retrieve serial data from the first external memory 20. The serial/parallel conversion circuit 19, which is connected to the data bus 25 and the command bus 26, converts the control program data (serial data) retrieved from the first external memory 20 to parallel data and provides the parallel data to the data bus 25. The control program data is provided to the second external memory 16 via the memory control circuit 17.

Further, the serial/parallel conversion circuit 19 is directly connected to the control microcomputer 18 by a route 27, which differs from the data bus 25 and the command bus 26. The route 27 is used when the control program data is re-written in response to a command from the host computer That is, the host computer gives the control microcomputer 18 a command to re-write the control program data. In response to the re-write command, the control microcomputer 18 generates a control signal for re-writing the control program data. The control microcomputer 18 serially provides the control signal to the first external memory 20 via the route 27 and the serial/parallel conversion circuit 19 to instruct the first external memory 20 to re-write the control program data.

The operation of the CD-ROM encoder/decoder 11 of FIG. 3 will now be discussed. When the CD-ROM encoder/decoder 11 (CD-R system/CD-RW system) is activated, the control program data stored in the first external memory 20 is stored in the second external memory 16 via the memory control circuit 17. In this state, the serial/parallel conversion circuit 19 converts the serial data from the first external memory 20 to parallel data and provides the parallel data to the memory control circuit 17.

The output of the serial data from the first external memory 20 requires a long transmission time in comparison to the output of parallel data. However, the data transfer from the first external memory 20 is performed simultaneously at a stage prior to the initiation of other data processing in the CD-ROM encoder/decoder. Thus, the data transmission time does not cause any problems That is, the transfer of the control program data is performed irrelevant to the time during which error correction or detection is performed. Thus, the processing speed for error correction or error detection is not affected. Further, the capacity of the second external memory 16 is set so that it is sufficient for storing all of the control program data. Thus, even if all of the control program data is stored in the second external memory 16, the storage of data resulting from error correction or detection is not affected at all. When the transfer of a control program to the second external memory 16 is completed, the preparation for waiting for a command from the host computer is completed.

Then, when the host computer gives the control microcomputer 18 a command for initiating the operation of the CD-ROM encoder/decoder 11, the control microcomputer 18 retrieves the command data from the host computer via the host interface 12. The control microcomputer 18 retrieves the necessary control program data from the second external memory 16 in accordance with the command data and sequentially executes the controls related with the recording or the reproducing of the CD-ROM data. When the CD-ROM data is recorded or reproduced, the calculation result of the error correction code ECC(P) or the data retrieved from the host computer or the DSP is temporarily stored in the second external memory 16 in the data processing stage. In this state, the data transferred between the second external memory 16 and each circuit is parallel data. Thus, the time required for the error correction and detection is substantially the same as that in the prior art.

The data processor 100 of the first embodiment has the advantages described below.

The data processor 100 includes the first external memory 20, which outputs serial control program data, and the serial/parallel conversion circuit 19, which converts the control program data into parallel data. This decreases the number of wires related with the transfer of the control program data. Thus, the number of pins for the CD-ROM encoder/decoder 11 is drastically reduced. This decreases the area of the semiconductor chip on which the CD-ROM encoder/decoder 11 is configured.

The transfer of the control program data from the first external memory 20 to the second external memory 16 is performed when the system is activated. Thus, the number of pins on the whole chip is reduced without affecting serial transfer during the error correction and detection periods.

For connections other than those with the first external memory 20, data is transferred in parallel with parallel lines. Thus, the pin quantity is reduced while guaranteeing the processing speed of the prior art without lengthening the time required for error correction and error detection.

Furthermore, when activating the system, all of the control program data is transferred from the first external memory 20 to the second external memory 16. Then, the control program data is transferred between the control microcomputer 18 and the second external memory 16. Normally, a recording medium, such as a DRAM, an SDRAM, and an SRAM, have a shorter access time than non-volatile memories such as a flash memory. As a result, the transmission time of the control program data to the control microcomputer 18 subsequent to the system activation is shortened, and the processing speed of the CD-ROM encoder/decoder 11 is increased.

Figure 6:
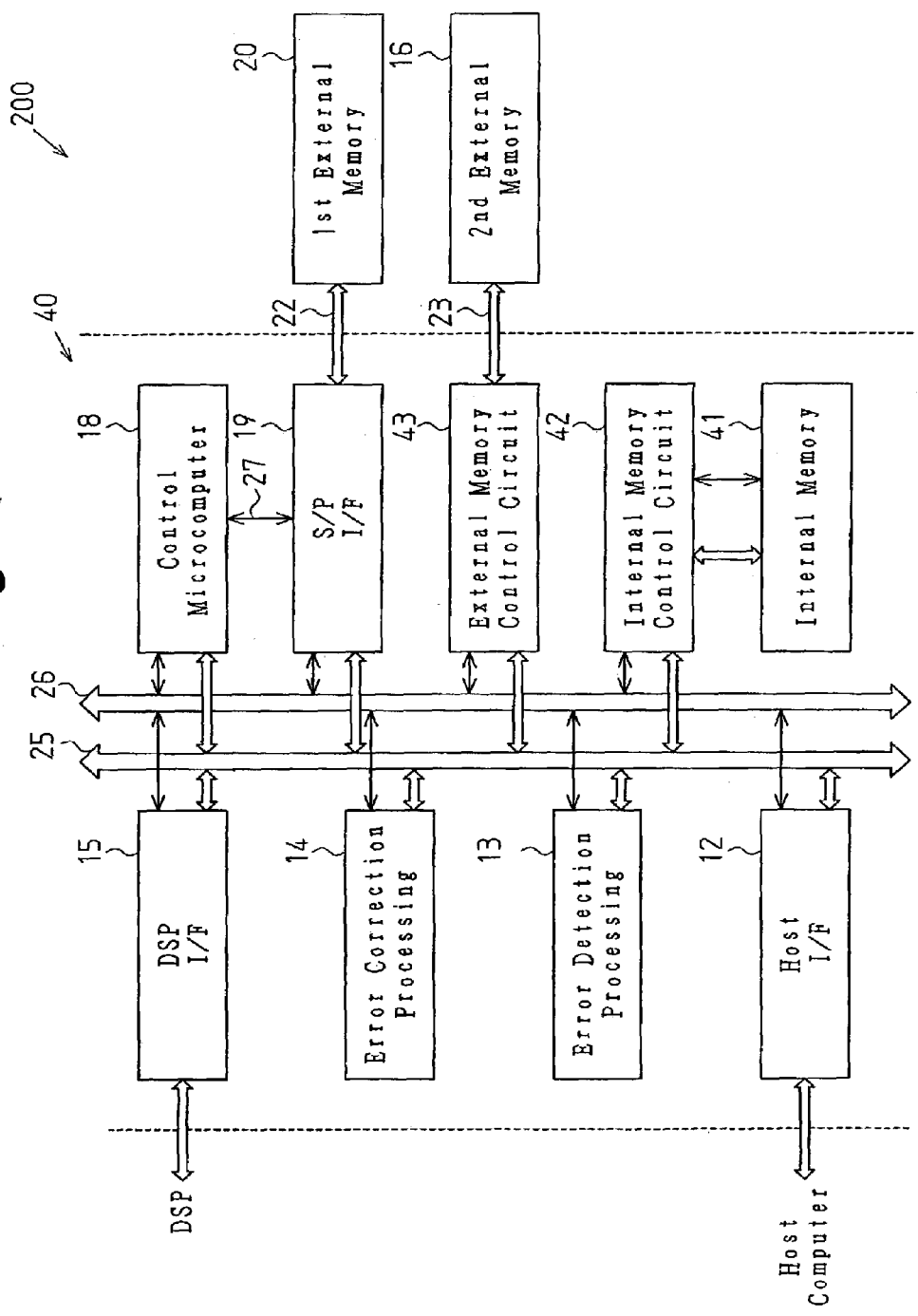
FIG. 6 is a schematic block diagram of a data processor according to a second embodiment of the present invention.

A second embodiment according to the present invention will now be discussed. FIG. 6 is a schematic block diagram of a data processor 200 according to a second embodiment of the present invention. The data processor 200 includes a CD-ROM encoder 40, a first external memory 20, and a second external memory 16.

As shown in FIG. 6, in addition to the configuration of the CD-ROM encoder/decoder 11 of the first embodiment, the CD-ROM encoder/decoder 40 of the second embodiment includes an internal memory 41 and an internal memory control circuit 42. The external memory control circuit 43 corresponds to the memory control circuit 17 of the CD-ROM encoder/decoder 11. The CD-ROM encoder/decoder 40 is configured on a semiconductor chip to which a first external memory 20 and a second external memory 16 are externally connected.

In the data processor 100 of the first embodiment, the retrieval of control program data by the control microcomputer 18 from the second external memory 16 is performed parallel to the error correction and detection processes. In this state, the accessing of the second external memory 16 by the control microcomputer 18 and the accessing of the second external memory 16 by each circuit is performed in a time-sharing manner. Thus, when the error correction process or error detection process is being performed, the retrieval of the control program data by the control microcomputer 18 is delayed. On the other hand, when the control microcomputer 18 is retrieving the control program data, the error correction and error detection processes are delayed. Thus, it is difficult to increase the processing speed of the CD-ROM encoder/decoder 11.

Accordingly, in the data processor 200 of the second embodiment, the memories used for the error correction process, the error detection process, and the retrieval of the control program data is divided into the internal memory 41 and the second external memory 16.

The internal memory 41 is a writable and readable recording medium, such as a DRAM, an SDRAM, and an SRAM. When recording CD-ROM data, the internal memory 41 temporarily stores the CD-ROM data read from the second external memory 16, the error detection code EDC(P) and the error correction code (P) respectively calculated by the error detection processing circuit 13 and the error correction processing circuit 14. When reproducing the CD-ROM data, together with the second external memory 16, the internal memory 41 temporarily stores the CD-ROM data retrieved from the DSP and the data that has undergone the error correction process The internal memory 41 has a capacity for storing at least two blocks of CD-ROM data. In the normal format of the CD-ROM data, a single block is configured by 2352 bytes. Thus, the internal memory 41 has a capacity of, for example, 4.8 Kbytes.

The internal memory control circuit 42 is connected to the internal memory to control the writing and reading of data from the internal memory 41. Further, the internal memory control circuit 42 is connected to the data bus 25 and the command bus 26 to provide the data read from the internal memory 41 to the error correction processing circuit 14 or the error detection processing circuit 13 and write the calculation result or data retrieved from the DSP to the internal memory 41. The data bus connecting the internal memory control circuit 42 and the internal memory 41 has, for example, about forty wires to enable the transfer of parallel data.

The external memory control circuit 43, which is substantially equivalent to the memory control circuit 17 of FIG. 3, is connected to the second external memory 16 to control the reading and writing of data to the second external memory 16. Further, the external memory control circuit 43 controls the reading of control program data from the first external memory 20 via the serial/parallel circuit 19.

The operation of the CD-ROM encoder/decoder 40 will now be discussed. When the CD-ROM encoder/decoder 40 (CD-R system/CD-RW system) is activated, the control program data stored in the first external memory 20 is first serially provided to the serial/parallel conversion circuit 19. The serial/parallel conversion circuit 19 converts the control program data from serial data to parallel data and provides the converted parallel control program data to the second external memory 16 via the external memory control circuit 43. When the transfer of the control program data to the second external memory 16 is completed, the preparation for waiting for a command from the host computer is completed.

Then, when the host computer provides the control microcomputer 18 with a command for starting the operation of the CD-ROM encoder/decoder 40, the control microcomputer 18 retrieves command data, which is provided from the host computer via the host interface 12. The control microcomputer 18 retrieves the required control program data when recording or reproducing CD-ROM data from the second external memory 16 in accordance with the command data and controls the circuits related with the recording or reproduction of CD-ROM data.

When recording CD-ROM data, 2048 bytes of recording data provided in units of single blocks from the host computer is retrieved in the host interface 12 and then temporarily stored in the second external memory 16 via the external memory control circuit 43. This is because data is provided from the host computer irrelevant to the operating state of data processing, such as the error correction and error detection processes. The recording data stored in the second external memory 16 is stored in the internal memory 41 via the external memory control circuit 43 and the internal memory control circuit 42 and provided to the error detection processing circuit 13. The error detection processing circuit 13 calculates the error detection code EDC(P) of the recording data. The calculated error detection code EDC(P) is provided to the internal memory 41 via the internal memory control circuit 42 and added to the stored recording data. Then, the recording data to which the error detection code EDC(P) has been added is read from the internal memory 41 and provided to the error correction processing circuit 14. The error correction processing circuit 14 calculates the error correction code ECC(P) of the recording data. The error correction code ECC(P) is provided to the internal memory 41 and added to the recording data to which the error detection code EDC(P) has been added. The recording data to which the error correction code ECC(P) and the error detection code EDC(P) have been added is provided to the DSP interface 15.

When the CD-ROM data is reproduced, the reproduction data provided from the DSP in units of single blocks is retrieved from the DSP interface 15 and then stored in the internal memory 41 and the second external memory 16 via the internal memory control circuit 42 and the external memory control circuit 43 Then, the reproduced data of the internal memory 41 is provided to the error correction processing circuit 14 to undergo error correction processing. Subsequently, in accordance with the correction result, the data stored in the internal memory 41 and the second external memory 16 are re-written with correct data. The reproduction data, which has undergone error correction, is provided to the error detection processing circuit 13 from the internal memory 41 to undergo error detection processing. In this state, when a code error is detected, an error flag is added to the reproduction data (CD-ROM data) stored in the second external memory 16. Then, in accordance with a request from the host computer, CD-ROM data is sequentially read from the second external memory 16 and provided to the host computer via the interface 12.

The data processor 200 of the second embodiment has the advantages described below.

The data processor 200 includes the first external memory 20, which receives and sends serial data, the serial/parallel conversion circuit 19, which converts the serial data from the first external memory 20 to parallel data, and the internal memory 41. That is, during the error detection and error correction stages, the data and control program data that is stored in a state divided between the internal memory 41 and the second external memory 16. Thus, the processing speed of the entire system is increased while the number of wires related to the transfer of control program data from the first external memory 20 is reduced. Further, memory access for performing the error detection process and the error correction process and memory access for reading the control program data from the control microcomputer 18 may be performed separately without any time restrictions.

It should be apparent to those skilled in the art that the present invention may be embodied in many other specific forms without departing from the spirit or scope of the invention. Particularly, it should be understood that the present invention may be embodied in the following forms.

The data processors 100 and 200 do not have to include the first external memory 20 and the second external memory 16.

The quantity of the wires 22 is not limited. For example, a data input wire and a separate data output wire may be connected to the first external memory 20. In this case, there are four wires 22.

In the second embodiment, the flow of data is not limited as long as data is stored in the CD-ROM encoder/decoder 40 in a divided manner. For example, the internal memory 41 may store only the data generated during the error correction process or the error detection process. Further, the control program data does not necessarily have to be transferred to the second external memory 16 and may be transferred to the internal memory 41.

In the above embodiments, the present invention is applied to a CD-R/CD-RW system, which uses a CD-R or CD-RW disc as a recording medium. However, the present invention may be applied to a system using other recording media, such as a DVD-R.

The present examples and embodiments are to be considered as illustrative and not restrictive, and the invention is not to be limited to the details given herein, but may be modified within the scope and equivalence of the appended claims.

What is claimed is:

1. A data processor for adding an error detection code and an error correction code to digital data and encoding the digital data, the data processor comprising:
    a detection processing circuit for generating the error detection code in units of blocks with the digital data;
    a correction processing circuit for generating the error correction code for each block with the digital data that includes the error detection code;
    a control circuit connected to the detection processing circuit and the correction processing circuit to control the detection processing circuit and the correction processing circuit in accordance with a control program;
    a first external memory connected to the control circuit to store the control program;
    a second external memory connected to the detection processing circuit and the correction processing circuit to store the digital data together with the error detection code and the error correction code; and
    a serial/parallel conversion circuit connected to the first and second external memories to receive data of the control program in a serial state from the first external memory and provide the second external memory with the control program data in a parallel state when the data processor is activated.

2. The data processor according to claim 1, wherein the detection processing circuit, the correction processing circuit, the control circuit, and the serial/parallel conversion circuit are configured on a single semiconductor substrate.

3. The data processor according to claim 2, further comprising:
    an internal memory configured on the semiconductor substrate and connected to the detection processing circuit and the correction processing circuit, wherein the internal memory has a capacity for storing at least two blocks of the digital data, wherein the internal memory partially stores data, which is temporarily stored in the second external memory, the error detection code, and the error correction code.

4. The data processor according to claim 1, wherein the first external memory includes:
    a memory cell array for storing the control program data; and
    a parallel/serial conversion circuit connected to the memory cell array to receive the control program data in a parallel state from the memory cell array and convert the parallel control program data to serial control program data.

5. A data processor for performing an error correction process and an error detection process on digital data to which an error correction code and an error detection code are added in units of blocks, the data processor comprising:
    a correction processing circuit for performing the error correction process on the digital data;
    a detection processing circuit connected to the correction processing circuit to perform the error detection process on the digital data that has undergone the error correction process;
    a control circuit connected to the correction processing circuit and the detection processing circuit to control the correction processing circuit and the detection processing circuit in accordance with a control program;
    a first external memory connected to the control circuit to store the control program;
    a second external memory connected to the detection processing circuit and the correction processing circuit to store the digital data together with data that has undergone the error correction process and data that has undergone the error detection process; and
    a serial/parallel conversion circuit connected to the first and second external memories to receive data of the control program in a serial state from the first external memory and provide the second external memory with the control program data in a parallel state when the data processor is activated.

6. The data processor according to claim 5, wherein the detection processing circuit, the correction processing circuit, the control circuit, and the serial/parallel conversion circuit are configured on a single semiconductor substrate.

7. The data processor according to claim 6, further comprising:
    an internal memory configured on the semiconductor substrate and connected to the detection processing circuit and the correction processing circuit, wherein the internal memory has a capacity for storing at least two blocks of the digital data, wherein the internal memory partially stores the digital data, the data that has undergone the error correction process, and the data that has undergone the error detection process.

8. The data processor according to claim 5, wherein the first external memory includes:
- a memory cell array for storing the control program data; and
- a parallel/serial conversion circuit connected to the memory cell array to receive the control program data in a parallel state from the memory cell array and convert the parallel control program data to serial control program data.

9. A data processor for adding an error detection code and an error correction code to digital data and encoding the digital data, wherein the data processor is connectable to a first external memory for storing a control program and a second external memory for storing data related to data processing, the data processor comprising:
- a detection processing circuit for generating an error detection code in units of blocks with the digital data;
- a correction processing circuit for generating an error correction code for each block with the digital data that includes the error detection code;
- a control circuit connected to the detection processing circuit and the correction processing circuit to control the detection processing circuit and the correction processing circuit in accordance with the control program;
- a serial/parallel conversion circuit for receiving data of the control program in a serial state from the first external memory and providing the second external memory with the control program data in a parallel state, wherein the serial/parallel conversion circuit receives the control program data from the first external memory when the data processor is activated; and
- a memory control circuit connected to the detection processing circuit, the correction processing circuit, and the serial/parallel conversion circuit, wherein the memory control circuit partially provides the digital data, the error detection code, and the error correction code to the second external memory.

10. The data processor according to claim 9, wherein the data processor is configured on a single semiconductor substrate.

11. The data processor according to claim 10, further comprising:
- an internal memory configured on the semiconductor substrate and connected to the detection processing circuit and the correction processing circuit, wherein the internal memory has a capacity for storing at least two blocks of the digital data, wherein the internal memory partially stores data, which is temporarily stored in the second external memory, the error detection code, and the error correction code.

12. A data processor for performing an error correction process and an error detection process on digital data to which an error correction code and an error detection code are added in units of blocks, wherein the data processor is connectable to a first external memory for storing a control program and a second external memory for storing data related to data processing, the data processor comprising:
- a correction processing circuit for performing the error correction process on the digital data;
- a detection processing circuit connected to the correction processing circuit to perform the error detection process on the digital data that has undergone the error correction process;
- a control circuit connected to the correction processing circuit and the detection processing circuit to control the correction processing circuit and the detection processing circuit in accordance with the control program;
- a serial/parallel conversion circuit for receiving data of the control program in a serial state from the first external memory and providing the second external memory with the control program data in a parallel state, wherein the serial/parallel conversion circuit receives the control program data from the first external memory when the data processor is activated; and
- a memory control circuit connected to the detection processing circuit, the correction processing circuit, and the serial/parallel conversion circuit, wherein the memory control circuit partially provides the digital data, data that has undergone the error correction process, and data that has undergone the error detection process to the second external memory.

13. The data processor according to claim 12, wherein the data processor is configured on a single semiconductor substrate.

14. The data processor according to claim 13, further comprising:
- an internal memory configured on the semiconductor substrate and connected to the detection processing circuit and the correction processing circuit, wherein the internal memory has a capacity for storing at least two blocks of the digital data, wherein the internal memory partially stores the digital data, the data that has undergone the error correction process, and the data that has undergone the error detection process.

* * * * *